United States Patent
Stut

[11] 3,980,042
[45] Sept. 14, 1976

[54] VAPOR DEPOSITION APPARATUS WITH COMPUTER CONTROL

[75] Inventor: Hans Stut, Groebenzell, Germany

[73] Assignee: Siemens Aktiengesellschaft, Berlin & Munich, Germany

[22] Filed: June 7, 1973

[21] Appl. No.: 367,832

Related U.S. Application Data

[62] Division of Ser. No. 236,680, March 21, 1972.

[52] U.S. Cl. .................................. 118/5; 118/8; 118/49.1
[51] Int. Cl. ............................................ C23c 13/08
[58] Field of Search ............ 118/4, 7, 8, 5, 48–49.5; 204/298

[56] References Cited
UNITED STATES PATENTS

| | | |
|---|---|---|
| 3,171,755 | 3/1965 | Reuschel et al. ............... 118/49.5 X |
| 3,316,386 | 4/1967 | Yaffee et al. ..................... 118/49 X |
| 3,347,701 | 10/1967 | Yamagishi et al. ............ 118/49.1 X |
| 3,459,152 | 8/1969 | Garrison et al. ......................... 118/5 |

Primary Examiner—Morris Kaplan
Attorney, Agent, or Firm—Hill, Gross, Simpson, Van Santen, Steadman, Chiara & Simpson

[57] ABSTRACT

An electric precipitation device and a method of producing highly pure semiconductor rods, in particular semiconductor rods consisting of silicon, by means of thermal decomposition and precipitation on corresponding carrier members in which a heating current which traverses the thickening carrier member is utilized for controlling at least one additional parameter which influences the precipitation of the semiconductor material. A process computer is preferably utilized for effecting control.

3 Claims, 5 Drawing Figures

VAPOR DEPOSITION APPARATUS WITH COMPUTER CONTROL

This is a division of application Ser. No. 236,680, filed Mar. 21, 1972.

BACKGROUND OF THE INVENTION

1. Field of the Invention

This invention relates to a method and an electric precipitation device for the production of semiconductor rods, and in particular to a method and apparatus for producing silicon rods. More specifically, the techniques of rod production include thermal disintegration of a gaseous compound containing the semiconductor material to be precipitated, precipitating the semiconductor material on at least one carrier member on a reaction chamber, which carrier member can be directly heated by means of an electric current which is made of the same material as that being precipitated, whereby the temperature of the thickening carrier member is controlled by adjusting the heating current flowing through the cross section of the carrier member.

2. Description of the Prior Art

A somewhat similar method to that disclosed herein is known from the Austrian Letters Patent 222,184 wherein an image is produced of the glowing semiconductor carrier member by means of an optical system, of the diameter of the image which changes with the diameter of the growing rod during the precipitation process is scanned with the help of a movable photocell and the bright-dark contrast which occurs in the picture plane at the limit of the light beam which emerges from the semiconductor rod is utilized for controlling a device which moves the photocell away from the focused beam and simultaneously increases the current in the heating circuit to such a degree that the temperature of the semiconductor rod is maintained at a desired, in particular constant, value.

From the German Offenlegungsschrift 1,444,421, another method for the operation of an electric precipitation device for obtaining pure semiconductor materials, such as germanium or silicon by means of thermal disintegration and precipitation on corresponding carrier members from compounds containing these elements is known. It is disclosed that the glowing temperature of the carrier or precipitation members which are heated to the dissociation temperature of the semiconductive compound is sensed with the help of a pyrometer in such a way that the radiation intensity of the radiation emitted by the precipitation member and growing with its cross sectional growth is transmitted onto the radiation sensitive surface of the pyrometer. Thereby, a surface is radiated onto the pyrometer, which surface grows in accordance with the growth of the cross section of the rod, whereby the growth of the radiating surface and the electric value produced thereby at the pyrometer with its changing absolute values are used to control or regulate the precipitation device when the growth reaches predetermined marginal values or interruption in the steady growth of the surface is encountered.

SUMMARY OF THE INVENTION

This invention relates to an improvement of the device known from the Austrian Letters Patent 222,184 and to an essential simplification of the precipitation device described in the German Offenlegungsschrift 1,444,421 and is characterized in that the heating current for heating the growing or thickening character member is utilized for controlling at least one further parameter which influences the precipitation of the semiconductor material on the carrier member.

In a further development of the invention, it is provided that the control of the parameter which influences precipitation of the semiconductor material is effected according to a current-dependent function. Therefore, according to a sample embodiment which utilizes the teachings of the invention, a process computer is utilized.

It is within the framework of this invention that, with increasing heating current I, the amount Q of gaseous semiconductor material offered to the reaction chamber per unit of time is simultaneously increased, while keeping the temperature constant.

It is also within the framework of this invention that, with increasing heating current I, the proportional molecular ratio of carrier gas and semiconductor compound is adjusted to a lower value, while keeping the surface temperature of the carrier member at a constant value.

Furthermore, it is also possible to lower the temperature required for the precipitation of the semiconductor material onto the carrier member to an optimum value during the separation process, with increasing heating current I, through the help of the method taught by the present invention.

It becomes possible, due to the present invention, in particular that a current flowing through the rod is utilized as a first approximation of a controlling magnitude for the separation of the semiconductor material and precipitation onto the carrier member, to obtain an optimum utilization of the initial materials which are required for obtaining the semiconductor material, such as silicon in poly-crystalline form, via a program control, for example the gas permeation and/or the molecular ratio between semiconductor compound and carrier gas. Thus, the high technical expense due to sensing the diameter of the growing semiconductor rod can be eliminated.

According to a particular embodiment of the invention, the precipitation device can also be operated with the help of a number of rod-shaped carrier members which are connected with a common mounting device and which are operated by way of a common heating-current source up to the precipitation temperature.

It is also within the framework of this invention that the doping material in the given ratio is supplied to the reaction chamber, as is required for a p- or n- conductivity of the growing carrier member, and in this manner semiconductor rods with certain controllable doping material concentration can be produced.

According to a particularly favorable embodiment of the invention, the doping material is supplied to the reaction chamber along with the carrier gas and the semiconductive compound as a gas current.

A device is used for executing the method according to this invention which is characterized in that a reaction chamber is utilized which is provided with a gas input opening and a gas output opening and in which the carrier members are mounted to receive the precipitation of the semiconductor material. The carrier members are connected with an adjustable heat current source and an optical pyrometer is arranged outside of the reaction chamber as a temperature measuring device in order to measure the surface temperature of the carrier members. The optical pyrometer is connected with the adjustable heat current source by way of a temperature regulator in such a way that the temperature can be adjusted to a constant or given value. A current transformer is connected into the heat current circuit in order to sense the flow of heating current and connected to a process computer and a program generator feeding the computer in order to control the amount of gas which is supplied to the reaction room and required for the precipitation process. The process computer is connected with both a carrier gas supply line and a supply line for the gaseous compound of the semiconductor material which is to be precipitated by way of respective regulator paths each of which include regulator valves and measurement value generators.

BRIEF DESCRIPTION OF THE DRAWINGS

Other objects, features and advantages of the invention, its organization, construction and operation will be best understood from the following detailed description taken in conjunction with the accompanying drawings, in which.

DESCRIPTION OF THE PREFERRED EMBODIMENT

Figure 1:
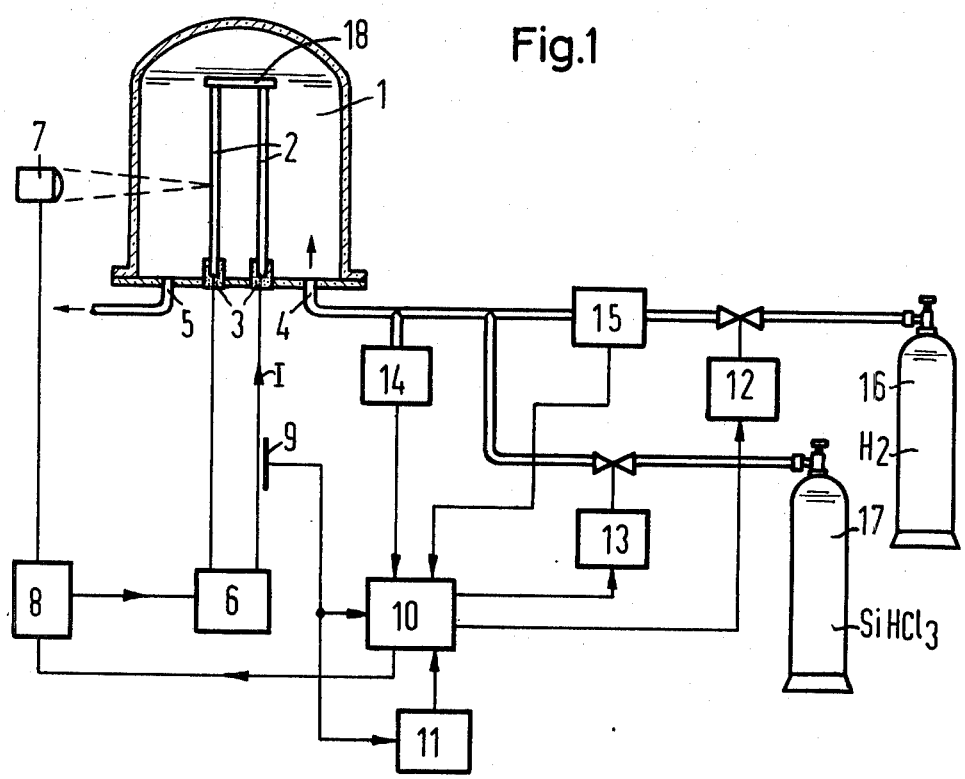
FIG. 1 illustrates an electrical precipitation apparatus together with the supply and control circuits for practicing the present invention.

Referring to FIG. 1, a pair of semiconductor rods 2 are mounted in a mounting device 3 made of pure graphite, which semiconductor rods 2 serve as initial precipitation members. These semiconductor rods 2 consist of silicon and are disposed in a reaction chamber 1 consisting of quartz. The semiconductor rods 2 are connected at their upper ends by a rod member 18, also consisting of silicon. The reaction chamber 1 is provided with a gas input opening 4 and a gas output opening 5. The reaction gas mixture, which possibly might also contain doping materials, is fed into the reaction chamber 1 through the gas input opening 4. The residual gases are removed from the reaction chamber 1 through the gas output opening 5.

The silicon rods 2, for example, are at a temperature of about 1150°C. and are maintained at the predetermined glow temperature by the heat current source 6, and serve as an electric resistance member which are traversed by the heating current I and heated due to the Joule heat which is produced by the current I. The temperature of the glowing silicon rods 2 is measured by a temperature measuring device 7 comprising an optical pyrometer and is utilized to automatically adjust the currents supplied by the heat current source 6, the control being effected by way of a temperature regulator 8 in such a way that the optimum separation temperature is obtained according to the present invention.

In order to sense the respectively flowing current, a current transformer 9 is inserted into the heating current circuit and is coupled to a process computer 10 which is fed by a program generator 11 for controlling the amounts of gas fed toward the reaction chamber 1 for the precipitation of the semiconductor material onto the silicon rods 2. The process computer 10 is further connected with the carrier gas supply 16 for hydrogen [$H_2$] and the supply device 17 for the semiconductor material which is to be precipitated [$SiHCl_3$] by way of regulator paths comprising a regulator valve 12 for controlling the amount of carrier gas, here hydrogen, and a regulator valve 13 for controlling the amount of semiconductor material [here silicon chloroform] which is to be precipitated. A measuring value generator 14 for sensing the gas composition, for example silicon chloroform in hydrogen, is connected in a common portion of the supply line which serves both the carrier gas supply 16 and the semiconductor gas supply 17. A measurement value generator 15 for sensing the flow of carrier gas, for example hydrogen, is interposed in the carrier gas feed line. With this arrangement, the supply device 17 for the semiconductor material may be provided either as a concentrate or as a carrier gas with a semiconductor material addition.

The process computer 10, which may also be a regulator or another type of device, and which forms a signal of a certain magnitude from the comparison between the desired gas amount, the desired gas composition and the desired temperature in accordance with information supplied from the program generator 11, for example from a punched strip, a magnetic tape or a punched card, depending on the current sensed by the current transformer 9 and the respective values sensed by the devices 14 and 15, controls gas feeding by controlling the regulator valves 12 and 13, and controls the temperature regulator 8, so that the entire process can be run at values which are respectively considered to be optimum values. The values can be adapted to the given circumstances, for example to the adjustment of a cost minimum of the device or to achieving a maximum yield of semiconductor material from the particular compound utilized or to a maximum utilization of the precipitation device.

Figure 2:
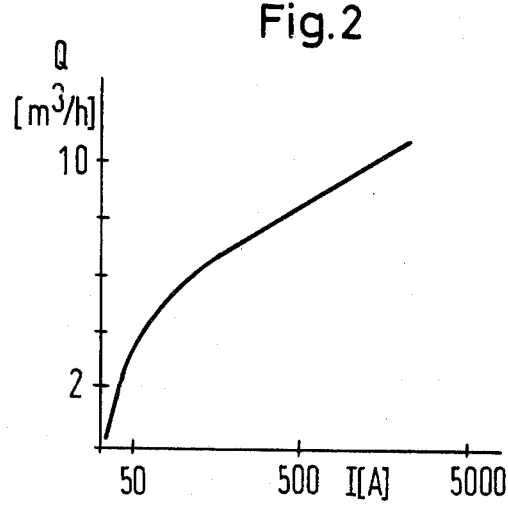
FIGS. 2–4 are curves which are provided on the basis of values regarded to be optimum, whose paths are employed as a basis, for example, for the control of the semiconductor material separation and precipitation onto the carrier members according to the teachings of the present invention.

With the help of the curve which is illustrated in FIG. 2 on a logarithmic scale, the control of the permeation Q in $m^3/h$, depending on the heating current I and with the temperature held constant, is shown as an exemplary embodiment m being in meters and h in hours. The curve of FIG. 2 shows that with increasing heating current I the permeation Q of the corresponding amounts of gas which are provided for thermal decomposition and the precipitation increase steadily, so that at about 5000 ampere, a permeation of 10 $m^3/h$ can be seen as optimum. This means that, with increasing current I, i.e. with increasing surface of the growing silicon rod, the permeation increases and therefore the amount of gas which is offered per unit of surface area remains constant. This also means, that with a given cost relation, an optimum utilization of the device is obtained.

Figure 3:
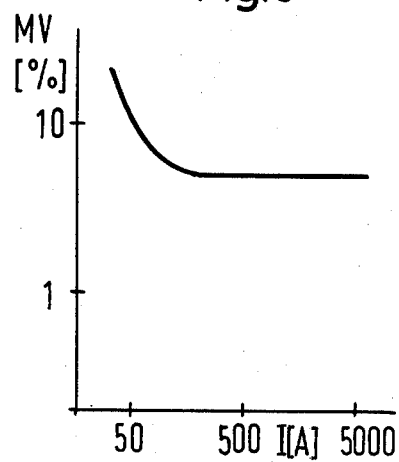

A sample embodiment for the application of the invention for control of the molecular ratio in the gas flow between the carrier gas consisting of hydrogen and the semiconductor gas consisting of silicon chloroform, which is supplied to the reaction chamber 1, is illustrated in FIG. 3 with the help of a curve represented in logarithmic scale. The optical pyrometer, which is contained in the temperature measuring device 7, receives the corresponding temperature from the silicon rods 2 which are heated to the dissociation temperature of the silicon chloroform. The heating current I is then adjusted by adjusting the heating current source 6 by way of the temperature regulator 8 in such a way that the temperature is first of all kept on a constant value corresponding to the growth of the diameter of the silicon rods within the reaction chamber 1. For a better utilization of the device it is advantageous to speed the growth of smaller diameter rods. This is obtained in such a way that the amount of silicon chloroform contained in the carrier gas is increased according to the curve of FIG. 3, whereby again the current I is utilized as an input measure. The control program provided in the program generator 11 therefore contains a function between the current I which is fed through the silicon precipitation rods 2 and the respectively corresponding advantageous mixture of the carrier gas flow consisting of hydrogen with the silicon chloroform gas according to the molecular ratio as respectively predetermined in the curve of FIG. 3. Therefore the precipitation process from the silicon chloroform at the silicon rods 2 with respect to the gas permeation Q in the precipitation device attains as favorable a degree of efficiency as possible for the amount of precipitation at the rods 2.

Figure 4:
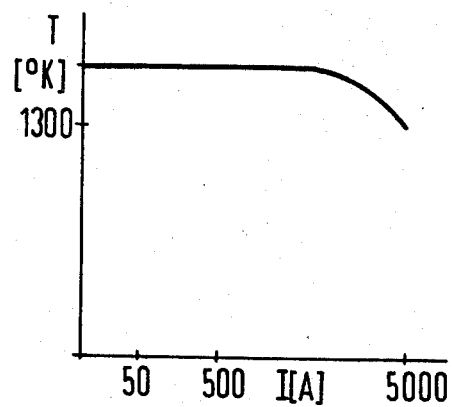

FIG. 4 also illustrates in a logarithmic form that, with increasing heating current I, i.e. with increasing rod diameter, the temperature at the surface decreases. This may prove necessary since the rod does not experience an overheating or even melting in its center with larger diameters due to the radial temperature distribution. According to the invention, the current is here also employed as a measure for the diameter.

Figure 5:
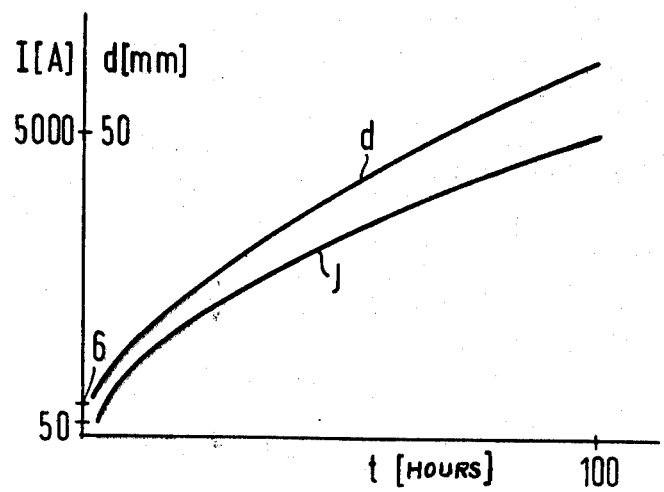
FIG. 5 is a graphical illustration showing the dependence of the heating current I or the diameter of the thickening carrier member, respectively, with respect to time.

FIG. 5 illustrates the dependence of the current I in amperes and the diameter $d$ in millimeters with respect to the time $t$ in hours of separation. The curves J, $d$ show that, with an equal utilization effect, but with much less cost due to the application of the current I as a controlling magnitude, a diameter-dependent optimization of the separation process can be obtained.

Although I have described my invention by reference to specific illustrations, many changes and modifications thereof may become apparent to those skilled in the art without departing from the spirit and scope of the invention. It is therefore to be understood that I intend to include within the patent warranted hereon all such changes and modifications as may reasonably and properly be included within the scope of my contribution to the art.

I claim:

1. A device for producing highly pure semiconductor rods, comprising: a reaction chamber having a gas input opening and a gas output opening; a mounting device mounting a plurality of carrier members within said reaction chamber; means serially connecting said carrier members so that each may be traversed by the same heating current; an adjustable heating current source connected to said serially connected carrier members; an optical pyrometer for measuring the surface temperature of the carrier members, said optical pyrometer disposed outside of said reaction chamber and connected to said adjustable heating current source; a temperature regulator connected between said optical pyrometer and said adjustable heating current source for adjusting said heating current source; a current transformer interposed in the connection between said adjustable heating current source and said carrier members for sensing the flow of heating current; a process computer and a program generator connected to and feeding said process computer information including the amount of gas required for precipitation, said process computer connected to said temperature regulator and to said current transformer to derive signals for controlling gas feeding in accordance with the desired amount of gas required for precipitation and the temperature of the carrier members as reflected by the sensed current; a supply of carrier gas and a supply of gaseous compound containing the semiconductor material to be precipitated, said gas supplies connected to said gas input opening of said reaction chamber; and regulating means interposed between the respective gas supplies and said gas input opening including respective regulator valves connected to and controlled by said process computer.

2. A device according to claim 1, further comprising a measurement value generator connected between said carrier gas supply and said gas input opening and connected to said process computer for providing the process computer with an actual carrier gas parameter for comparison with a desired carrier gas parameter furnished by said program generator.

3. A device according to claim 1, comprising a measurement value generator connected to sense the mixture of carrier gas and the gas compound containing the semiconductor to be precipitated, said measurement value generator connected to said process computer for providing said process computer with an actual parameter of concentration for comparison with a desired concentration provided by said program generator.

* * * * *